United States Patent [19]
Jacob

[11] Patent Number: 5,221,233
[45] Date of Patent: Jun. 22, 1993

[54] CONSTANT VELOCITY FIXED JOINT WITH ALTERNATE SEQUENTIAL RUNNING GROOVES

[75] Inventor: Werner Jacob, Frankfurt am Main, Fed. Rep. of Germany

[73] Assignee: GKN Automotive AG, Siegburg, Fed. Rep. of Germany

[21] Appl. No.: 773,348

[22] Filed: Oct. 7, 1991

[30] Foreign Application Priority Data

Oct. 8, 1990 [DE] Fed. Rep. of Germany ....... 4031819

[51] Int. Cl.⁵ .............................................. F16D 3/223
[52] U.S. Cl. ..................................... 464/145; 464/906
[58] Field of Search ..................... 464/139, 141–146, 464/906

[56] References Cited

U.S. PATENT DOCUMENTS

| | | | |
|---|---|---|---|
| 2,319,100 | 5/1943 | Anderson | 464/906 X |
| 2,875,600 | 3/1959 | Miller, Jr. | 464/906 X |
| 3,133,431 | 5/1964 | Zech | 464/145 X |
| 3,475,924 | 11/1969 | Aucktor | 464/145 X |
| 4,079,599 | 3/1978 | Girguis | 464/906 X |
| 4,185,476 | 1/1980 | Krude | 464/906 X |
| 4,397,507 | 8/1983 | Kraus et al. | 384/577 X |
| 4,608,028 | 8/1986 | Welschof et al. | 464/906 X |
| 4,820,240 | 4/1989 | Girguis | 464/145 |
| 4,950,206 | 8/1990 | Jacob | 464/145 X |
| 4,968,287 | 11/1990 | Jacob | 464/906 X |
| 5,067,929 | 11/1991 | Krude | 464/903 X |

*Primary Examiner*—Daniel P. Stodola
*Assistant Examiner*—William G. Battista, Jr.
*Attorney, Agent, or Firm*—Harness, Dickey & Pierce

[57] ABSTRACT

A constant velocity fixed joint for large articulation angles and a high torque capacity has an inner member and an outer member produced with undercut-free opposing first outer running grooves and first inner running grooves as well as opposing outer running grooves and second inner running grooves starting from different open end faces. To achieve a constant track depth, as possible, via the articulation angle, the webs between two circumferentially adjoining outer running grooves are divided into first and second inner faces which extend, in an undercut-free way, from the same open end face of the directly adjoining outer running grooves.

19 Claims, 4 Drawing Sheets

CONSTANT VELOCITY FIXED JOINT WITH ALTERNATE SEQUENTIAL RUNNING GROOVES

BACKGROUND OF THE INVENTION

The invention relates to a constant velocity fixed joint having a hollow outer member with a central cavity whose inner face, in meridian planes, is provided with first and second outer running grooves. The running grooves extend along the longitudinal axis of the outer member and alternate sequentially on the circumference. An inner member is arranged in the central cavity of the outer member. The inner member has a spherical outer face which, in meridian planes, is provided with first and second inner running grooves. The grooves extend along the longitudinal axis of the inner member and are positioned opposite the respective first and second outer running grooves. Together the inner and outer grooves are designed to be jaw-like towards one of the two open ends. For torque transmitting purposes, each set of opposing outer and inner running grooves jointly accommodate a ball which is guided radially in windows of a cage arranged between the outer face of the inner member and the inner face of the outer member. The track bases of the first outer running grooves and those of the first inner running grooves are undercut-free starting from one open end. The track bases of the second outer running grooves and those of the second inner running grooves are undercut-free from the opposite open end.

U.S. Pat. No. 3,133,431 discloses a joint with tracks for torque transmitting balls. The tracks may optionally be undercut-free towards the two open ends. The joint is designed as a plunging joint. For a joint with cage, the tracks extend in a straight line. For a cageless joint, the tracks, in addition to extending at an angle in the meridian plane, are curved in a plane extending at a right angle to the meridian plane. Only when the tracks extend in a straight line is it possible for the tracks to be undercut-free. However, the design principle permits only small articulation angles and short plunging distances in order to permit assembly and to prevent the components from falling apart.

GB-PS 847 569 describes a fixed joint with torque transmitting balls and tracks extending in meridian plane. The tracks extend with a radius. The radii of the track bases of two track pairs open in opposite directions and are offset relative to the joint center. The joint has a ball guiding cage designed as a hollow spherical dish. The cage and the outer part and inner part of the joint are provided with concentric spherical faces for mutually guiding each other. The ball tracks and the guiding track for the cage are undercut and therefore cannot simply be produced by precision forming.

In the case of the said design principles, the forces acting on the cage are to be offset by the alternate openings of the tracks for the ball. However, this does not happen in all operating conditions because the contact of the balls in the tracks over the entire range of articulation angles changes, which inter alia results in a change of direction of the load applied to the cage, thus placing the cage in an unstable position. Joints whose tracks extend in a straight line in meridian planes are subject to a further disadvantage in that, towards one end of each track, the track depth which is decisive for the torque transmitting capacity is decreased considerably.

It is the object of the present invention to provide a joint which is suitable as a fixed joint for large articulation angles, which even at large articulation angles has a high torque transmitting capacity and whose outer and inner members may be produced in a non-chip forming way by precision forming.

SUMMARY OF THE INVENTION

The objective is achieved in the present invention by employing certain design criteria. The joint cage has a spherical inner face arranged concentrically relative to the spherical outer face of the joint inner member. A spherical outer face is arranged concentrically relative to the spherical inner face of the joint outer member. The inner face of the outer member is composed of the sum of the faces of the webs between two circumferentially adjoining outer running grooves. These faces are divided into first and second inner faces of which the first inner faces are designed to be undercut-free starting from the open end face of the outer member from which the first outer running grooves extend in an undercut-free way. The second inner faces are designed to be undercut-free starting from the other open end face of the outer member from which the second outer running grooves extend in an undercut-free way.

By designing the inner face of the outer member which is arranged opposite the spherical outer face of the cage a faces which alternately extend in an undercut-free way from the open end faces of the outer member, it is possible, even at large articulation angles, to provide great track depth which allows the torque transmitting balls to be enveloped completely. As a result, it is possible to produce the outer joint member in a non-chip forming way from the two open end faces without requiring any subsequent machining.

The greater track depth achieved at the axial ends of the tracks allows a higher torque transmitting capacity at large articulation angles.

In a further embodiment of the invention, the first and second outer running grooves are alternately arranged across the circumference of the outer member. The webs between the grooves are divided into first and second inner faces, with the first inner faces immediately adjoining the first outer running grooves and the second inner faces immediately adjoining the second outer running grooves.

With reference to constant velocity fixed joints where the first and second outer running grooves are circumferentially arranged in a sequence of groups of at least two first and two second outer running grooves each, the webs between the first outer running grooves are designed as first inner faces and the webs provided between the second outer running grooves as second inner faces. The webs between the groups of first and second outer running grooves are divided into first and second inner faces, with the first inner faces immediately adjoining the first outer running grooves and the second inner faces immediately adjoining the second outer running grooves.

To simplify assembly of the joint, in one embodiment of the invention the cage is split or divided, preferably into two halves. These are form-fittingly connected to each other in the axial direction by matching projections and indentations. However, the split cage may also be rolled from a piece of strip whose two circumferentially extending ends form-fittingly engage each other by matching projections and indentations. As the cage itself only has a holding function relative to the balls, but does not actively ensure control into the angle-bisecting plane, there is no need for the divided cage halves or split case ends to be fixed in any other way relative to each other. In the case of high speed joints, the cage may rest on the inner face of the outer joint member to support itself. If the split cage is produced from a strip, it is elastically opened for assembly purposes.

In order to achieve balanced forces in respect of the cage for both directions of rotation, over the entire range of articulation angles and in all rotational angular positions, the contact tracks of the balls in the first and second outer running grooves are opposite the contact tracks of the first and second inner running grooves. The opposing contact points of the balls in the associated outer running grooves and inner running grooves form a cage control angle which is always greater than the self-inhibition angle, preferably greater than 7°.

The application of the above teaching with reference to constant velocity fixed joints, in the case of which the ball tracks all open in one direction and the cage is guided on the inner joint member, has already been described in U.S. Pat. No. 4,968,287. The above teaching ensures that in all angular positions of the cage relative to the outer and inner members, a defined position is achieved. Unstable conditions do not occur. The balls of the first running track always load the cage in one direction whereas the balls of the second running track load the cage in the opposite direction. The cage is always held so as to be positioned accurately. The forces are balanced. There is no need for the cage to be guided relative to the inner part or outer part. This also has an advantageous effect on the friction conditions.

Preferably, the outer running grooves and the inner running grooves, as extending in their respective meridian planes, are at least partly formed as circular arches which are offset towards opposed ends from the central ball plane. In addition, the track portions leading to the open end faces and extending in a straight line are inclined relative to the longitudinal axis of the members in order t facilitate extraction of tools used for precision forming, e.g. precision forging of the joint members.

In a further embodiment, the outer grooves and the inner grooves, in respect of their cross section, have a shape which deviates from the circular shape. As a result, under articulation conditions, contact of the balls at the groove wall can be selected to be such that there exists a sufficient distance from the edge of the running groove and the contact point of the ball in the running groove.

Furthermore, it is proposed that the contact tracks traced by the individual contact points of the balls in the running grooves across the articulation range of the joint should be arranged at a predetermined distance from the groove edge between the inner face of the outer member and the outer running groove and/or the outer face of the inner member and the inner running groove. The predetermined distance is always greater than half the amount of the large axis of the pressure ellipse permissible for the respective angle of articulation and the associated torque. In this way, overloading of the joint is effectively prevented.

Preferably, in the regions of the contact tracks towards their two axial ends, the large axis of the pressure ellipse should be smaller than in the central region of the contact tracks. This design ensures that if the track depth decreases towards the axial ends of the inner and outer running grooves, the contribution of the individual balls towards torque transmission may be controlled. This may be achieved by two alternative track designs. In the first alternative track design, the osculation between the ball and contact track is increased towards the axial end regions. In the second alternative track design, the cross section of the ball tracks towards the axial end regions are increased, e.g. it is possible to change the contact track by introducing a small contact angle and change the degree of osculation.

In order to permit assembly in the case of joints for particularly large articulation angles, the outer member is divided into two or more annular segments. Preferably, the outer member is first finish-produced to its final dimensions with all its design features. Subsequently it is divided by breaking it. The outer member is broken by applying force to the predetermined weakened regions. The weakened regions are preferably located in the webs. The weaker regions can be formed by locating bores in the webs. In addition, it is possible to provide radially extending notches near the bores. Breaking can be accomplished by applying outward radial pressure.

With reference to the outer member assembled from broken annular segments, the annular outer member on its outer face and/or its end faces preferably is provided with tooth-like projections and is adapted to be received in a sleeve or bell whose wall is form-fittingly connected to the projections through non-chip forming deformation.

DETAILED DESCRIPTION OF THE PREFERRED EMBODIMENT

Figure 1:
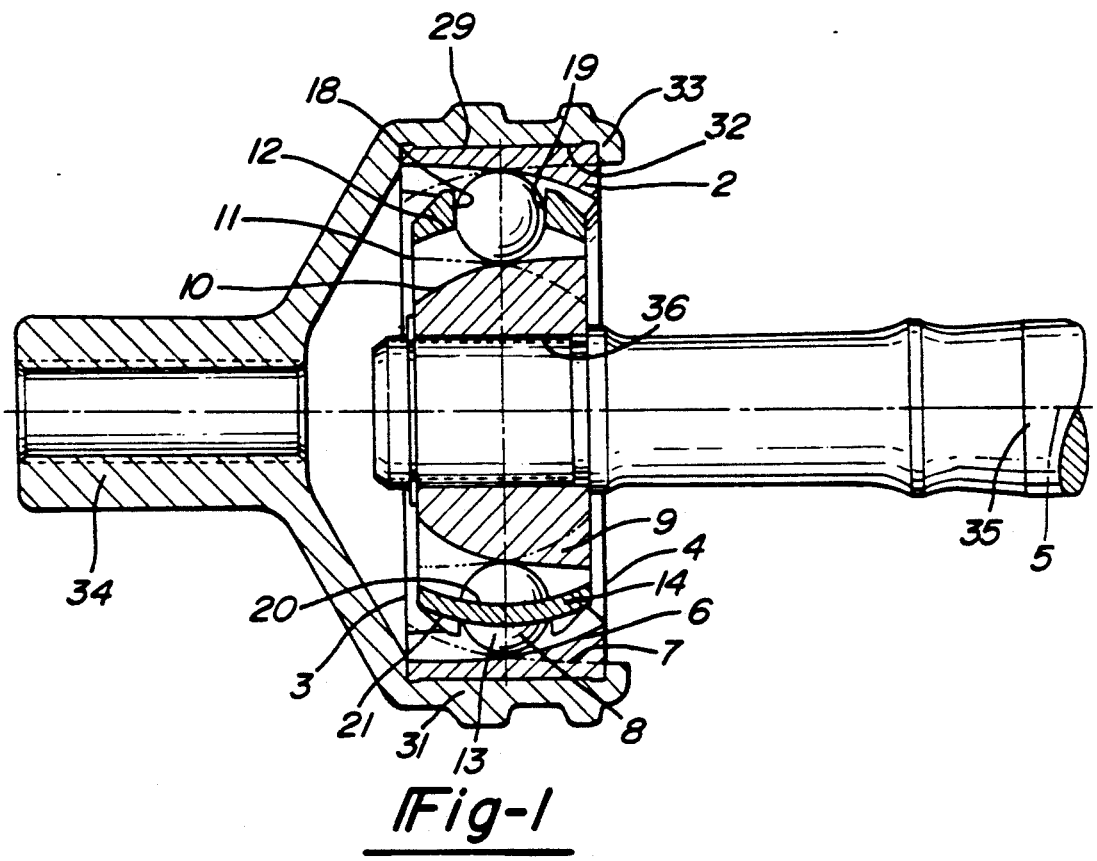
FIG. 1 is a longitudinal sectional view of a constant velocity fixed joint of the present invention.

The constant velocity fixed joint as illustrated in FIG. 1 is intended for large articulation angles. It substantially consists of the outer member 2, shown in greater detail in FIGS. 2 and 3, the inner member 9, the cage 14, arranged between the outer member 2 and inner member 9, and the balls 13 held by the cage 14. The balls 13 serve to transmit torque between the outer member 2 and the inner member 9. The longitudinal axis of the joint components has been given the reference number 5. In the extended position of the constant velocity fixed joint 1 illustrated in FIG. 1, the longitudinal axes of all components coincide. Torque transmission between the outer member 2 and the inner member 9 is effected via the ball 13 which engage the outer running grooves 6 and 7 of the outer member 2 and the opposed inner running grooves 10 and 11 of the inner member 9. There are two different types of running grooves. The first outer running grooves 6 of the outer member 2 are arranged opposite the first inner running grooves 10 of the inner member 9. The first outer running grooves 6 and the first inner running grooves 10 form a jaw-like opening whose greatest cross section is directed towards the first open end face 3 of the outer member 2.

Figure 2:
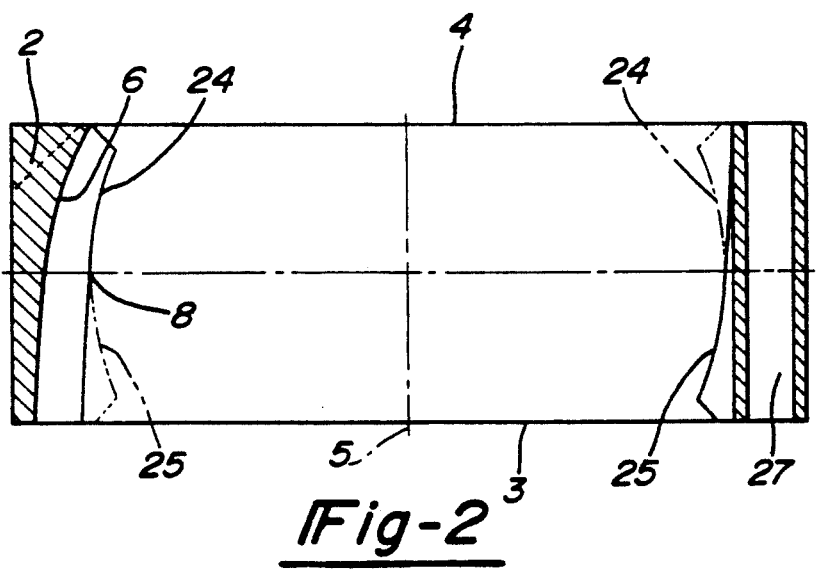
FIG. 2 is an enlarged sectional view through line 2—2 of FIG. 3.
Figure 3:
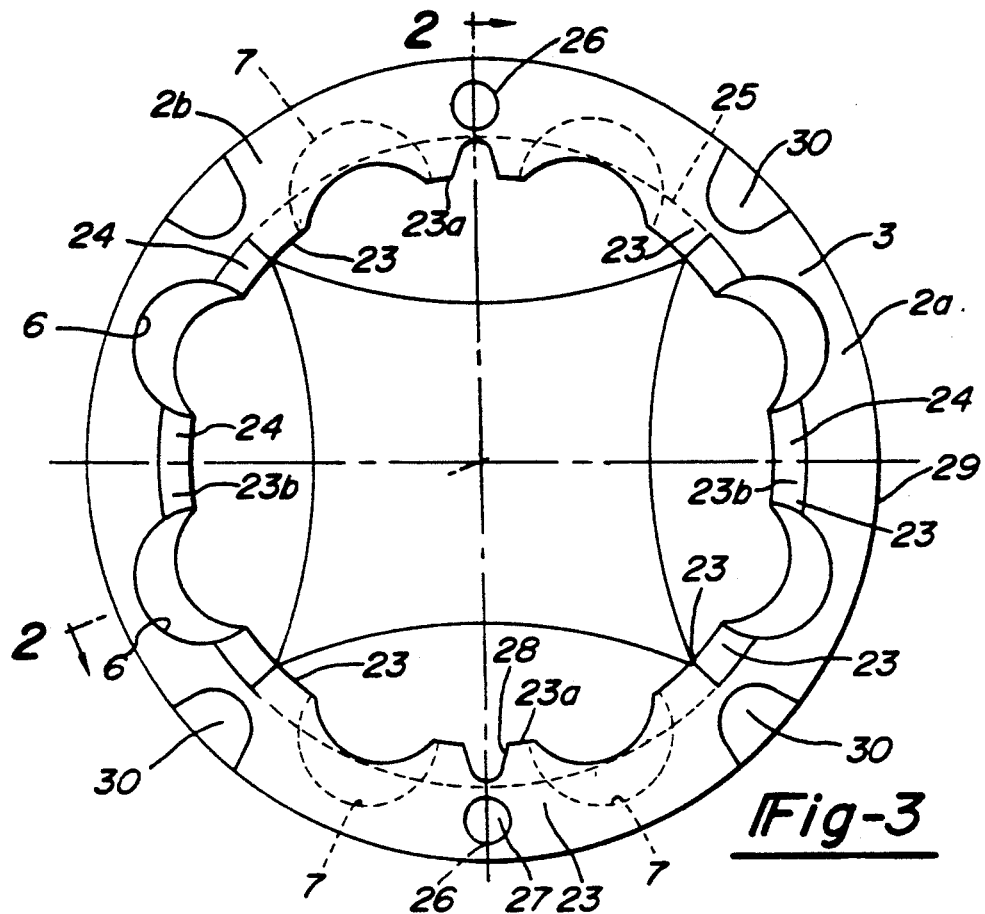
FIG. 3 is a plan view of the outer member of the constant velocity fixed joint of FIG. 1.

The first outer running grooves 6 and inner running grooves extend from the first open end face 3 and are undercut-free. FIG. 3 shows that the first outer running grooves 6 are arranged in pairs. The same applies to the second outer running grooves 7 and the opposed second inner running grooves 11 of the inner member 9 which, in an undercut-free way, start from the second open end face 4 of the outer member 2. The webs 23, 23a, 23b are positioned between outer running grooves 6 and 7 and paired outer running grooves. The inwardly directed faces of the webs 23 ar the first and second inner faces 24 and 25. The inner faces 24 and 25 envelop the spherical outer faces 21 of the cage 14 and form the inner face 8 (FIG. 2) of the outer member 2. The group sequence of two first inner running grooves 6 and second outer running grooves 7 each provided in accordance with FIGS. 2 and 4 also includes first and second inner faces 24 and 25 which extend in an undercut-free way from a starting basis corresponding to that of the immediately adjoining outer running grooves 6 and 7. Thus, between the two immediately adjoining outer running grooves 6 forming a first group, there are provided inner face parts 24 extending over the entire width of the webs 23b. The inner face of the webs 23 between a first outer running groove 6 and a second outer running groove 7 is divided into two inner faces 24 and 25 with the first inner face part 24 immediately adjoining the first outer running groove 6 and the second inner face part 25 immediately adjoining the second outer running groove 7. Manufacture of the outer member 2 can be carried out by introducing tools from the two open ends 3 and 4 of the outer member 2. The blank can be a ring received in a holding device. One of the tools can have the contour of the first outer running grooves 6 and the first inner face parts 24, whereas the second tool can have the contour of the second outer running grooves 7 and the second inner face parts 25. This is possible because the first outer running grooves 6 and the first inner face parts 24 are designed to be undercut-free from the open end, e.g. the open end 3 of the outer member 2, with the second outer running grooves 7 and the second inner face parts 25 being designed to be undercut-free from the other open end 4 of the outer member 2. Nevertheless, as can be seen in FIG. 2, the cage 14 is enclosed towards both open ends 3 and 4 by the webs 23.

FIG. 1 also shows that the cage 14 with its spherical outer face 21 is arranged with play relative to the spherical inner face 8 of the outer member 2 formed of the inner faces 24 and 25. The cage 14 is centered entirely via the balls 13.

Figure 7:
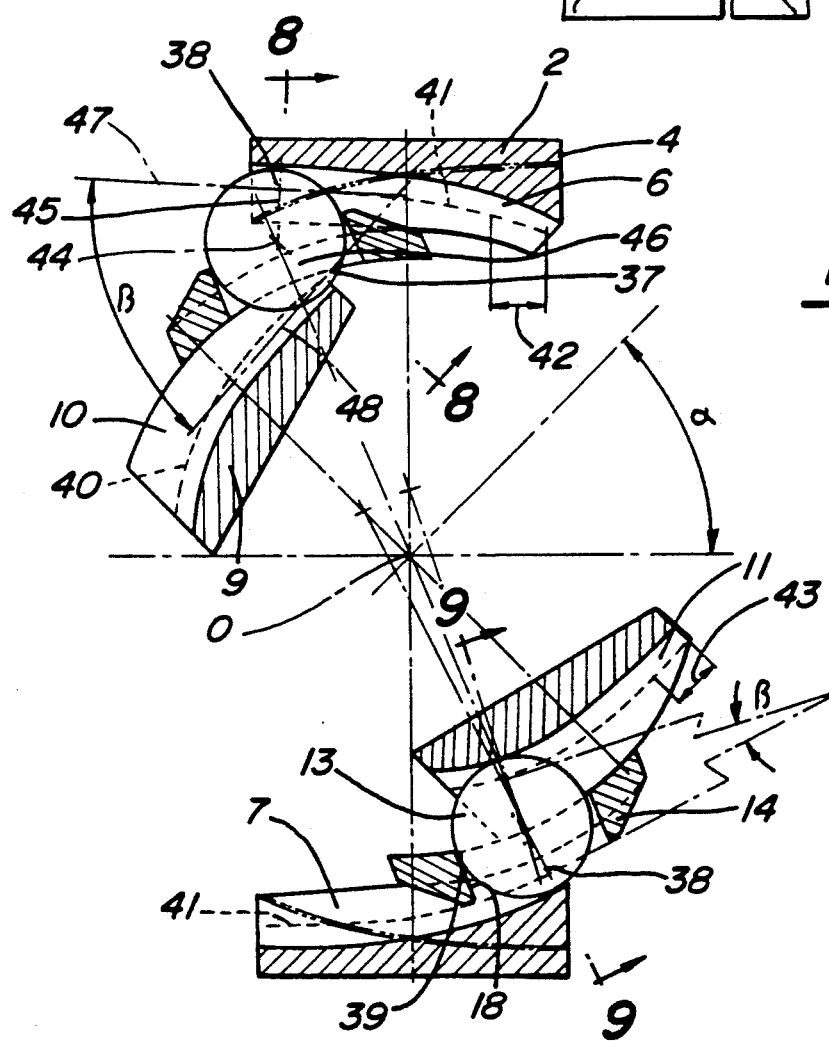
FIG. 7 is a sectional view of the joint of FIG. 1 in articulation.

In order to ensure that even at large articulation angles the balls 13 are satisfactorily supported, the cage 14 is provided with protuberances 22 (FIG. 4) radially projecting from its outer face 21. These are clearly illustrated in FIGS. 4 and 5. The protuberances 22 are arranged in the region of the cage windows 17. Under articulation conditions, the cage windows 17 permit the balls 13 to adjust in the circumferential direction of the cage 14. The change in the radial contact of the balls 13 when the joint is articulated is shown in FIG. 7. Upon joint articulation towards the open end from which an outer running groove 6 or 7 starts, the ball 13 radially outwardly contacts the loaded window face 18, whereas in its inner position, i.e. towards the other opening end, it contacts the window face 18 radially inwardly. The opposite window face 19 is also provided with a protuberance 22 in order to avoid jamming of the balls 13 under all articulation conditions.

For those cases where the first outer running grooves 6 and second outer running grooves 7 and the corresponding first and second inner running grooves 10 and 11 are not arranged in a group sequence (not shown), as shown in FIG. 3, the running grooves alternate on the circumference. The first outer running groove 6 is followed by a second outer running groove 6, etc. The webs 23 between a first outer running groove 6 and the subsequent second outer running groove 7 are divided into inner faces 24 and 25, such as it was described in connection with the design of the inner web faces for outer member 2 of FIG. 3 between the adjoining first outer running grooves 6 and the second outer running grooves 7 of two adjoining groups of outer running groups 6 and 7.

Figure 4:
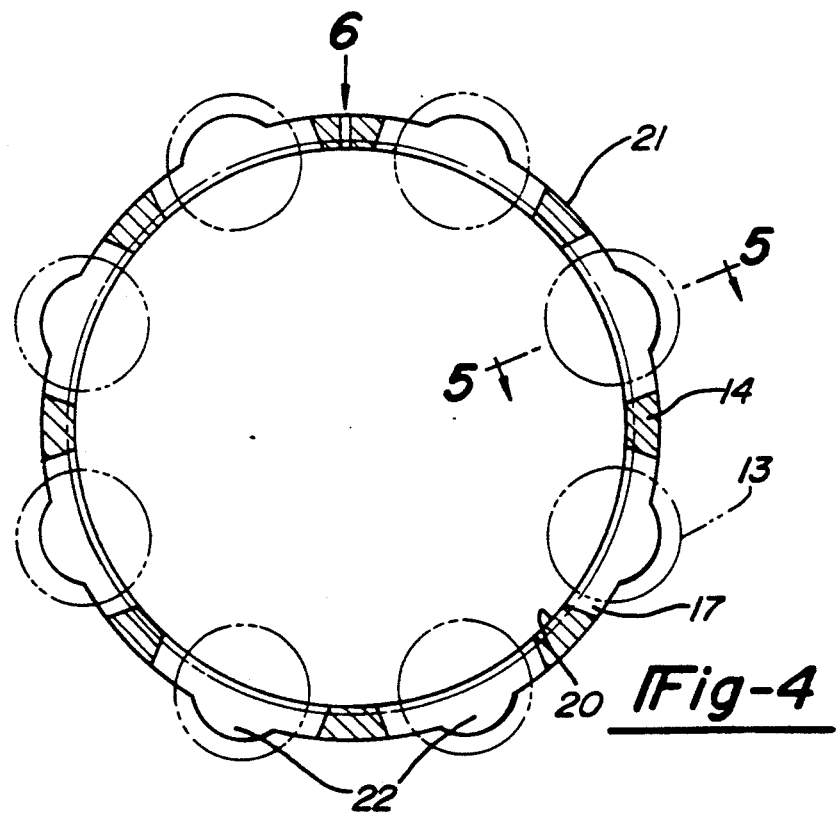
FIG. 4 is a cross sectional view of the cage of the constant velocity fixed joint of FIG. 1.
Figure 5:
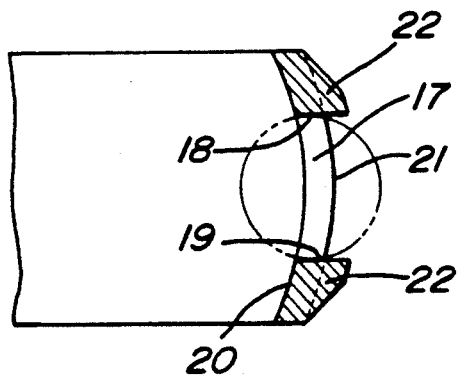
FIG. 5 is an enlarged cross sectional view along line 5—5 of FIG. 4.
Figure 6:
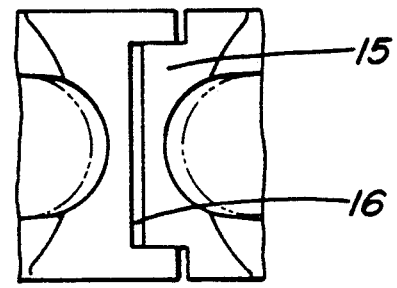
FIG. 6 is a sectional view along line 6 of FIG. 4.

As far as the assembly of such a joint, it is possible to fit the inner member 9 in the cage 14, depending on the design angle of articulation by transverse insertion. However, this makes it necessary for at least one of the windows 17 to have a circumferential dimension which at least corresponds to the width of the inner part 9, or the cage has to be split as shown in FIGS. 4 and 6. For this purpose, the cage 14 is separated in at least one place. Separation is achieved in the circumferential direction between two adjoining windows 17. The one cage end is provided with a projection 15 and the other cage end with an indentation 16 adapted to receive the projection. It is possible to produce the cage from a flat material. The windows 17 may be punched into the flat material. Subsequently, the material is rolled into an annular cage giving it its annular shape as shown in FIG. 4, including the spherical inner face 20 and the spherical outer face 21. As the projection 15 receives the recess 16 and they support each other in the axial direction of the cage 14, the cage is also able to assume its guiding function for the balls 13, e.g. to hold them in the angle-bisecting plane. For assembly, the cage 14 is elastically opened and axially slid over the inner member 9. After it is aligned around the inner member, it is allowed to spring back into its original configuration.

Figure 10:
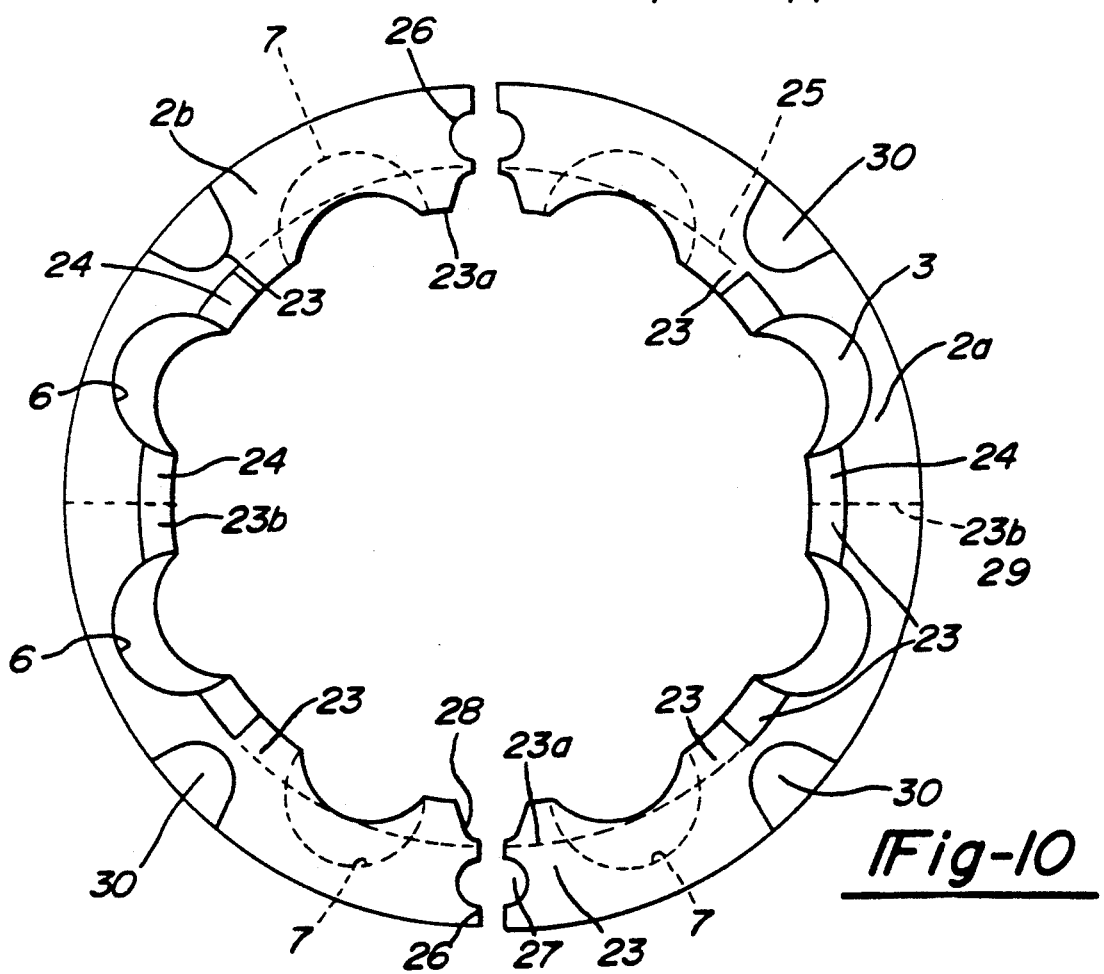
FIG. 10 is a view like FIG. 2 illustrating the outer member broken into pieces with phantom lines illustrating additional breakpoints.

In the case of joints with smaller articulation angles, assembling the cage 14 and inner member 9 and introducing the balls 13 into the outer member 2 can be effected by over-articulation. However, in the case of joints designed for large articulation angles and high torques, assembly may be effected by dividing the outer members 2. For this purpose, as illustrated in FIGS. 2 and 3, the outer part 2 is divided by breaking it along bores 27 in opposing webs 23a each extending axially, i.e. parallel to the axis 5. The webs 23a notches 28 starting from the inner faces 24 or 25 radially inward from the bores. Prior to breaking, the outer part 2 is finished to its final dimensions with all its design features, including hardening. After completion, the outer part 2 is subjected to outward radial pressure to break it into two individual annular segments 2a and 2b, as seen in FIG. 10. During assembly, after the cage, which was open elastically, has been slid over the inner part 9, the balls 13 may be slid into the windows 17 from the outside. Subsequently, the two annular segments of the outer member 2 are reassembled around the assembled cage, balls and inner member and the outer face 29 of the assembled outer member 2 is inserted into a bore 32 of bell 31 with an open end face 3 facing the bore 32. The bell 31 supports the assembled outer member 2 in the radial direction. To achieve a non-rotating connection, recesses 30 (FIG. 3) are provided in one of the open end faces 3 or 4. After the unit has been inserted into the bore 32, the wall 33 of the bell 31 is deformed in such a way that it extends over the end face forming the opening 4, with material entering the region of the recesses 30.

In this way it is possible to achieve a non-rotating connection. The bell 31 is part of a journal 34 employed for non-rotating connection of the constant velocity fixed joint to a driving or driven machine part. A shaft 35 is inserted into the bore 36 of the inner member 9. For this purpose, the shaft 35 and the bore 36 are provided with splines.

The irregular contour of the break in regions 26 of the outer member 2 ensures accurate relative centering or registration of the two outer part segments into their original positions. There is no need for any further centering or registration means.

Figure 8:
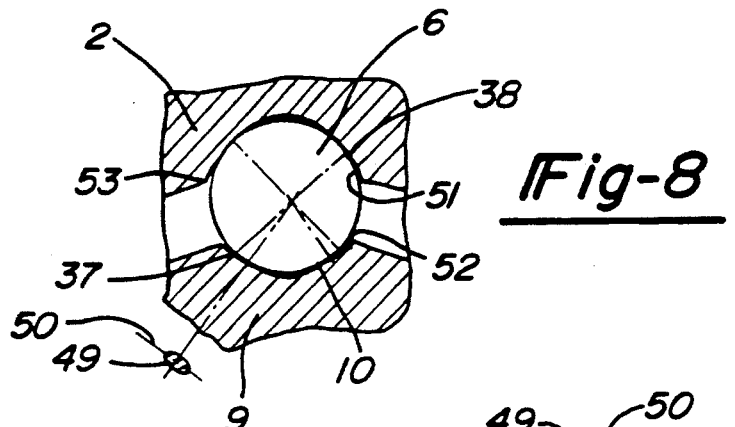
FIG. 8 is a partial sectional view of the joint of FIG. 7 along line 8—8.
Figure 9:
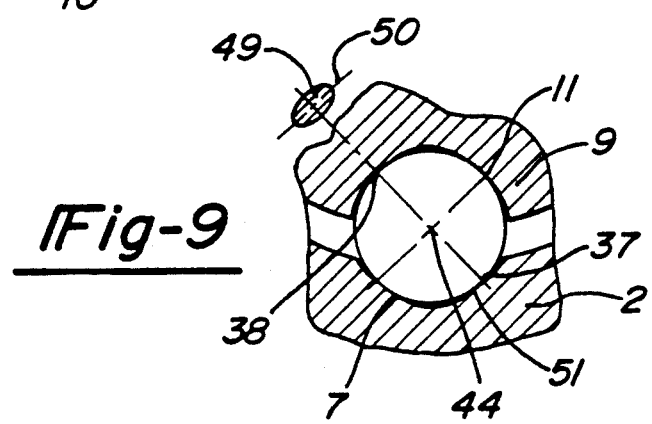
FIG. 9 is a partial sectional view of the joint of FIG. 7 along line 9—9.

FIGS. 7 through 9 illustrate the contact conditions between the balls 13 of the first running grooves 6 and 10 in the different articulation positions at maximum articulation (articulation angle α). The contact point 37 is the point of contact between the first inner running groove 10 of the inner member 9 and the balls 13. The contact point 38 is the point of contact between the first outer running groove 6 of the outer member 2 and the ball 13.

FIG. 7 is a simplified illustration of the control conditions of the constant velocity fixed joint with reference to two track pairs formed of first and second running grooves, the joint being in the articulated condition. The location of the contact points 37 and 38 is shown from the side and from open end face 4 in FIGS. 7 through 9.

FIGS. 8 and 9 also show the position of the two contact points 37 and 38 relative to the running groove edges 52 and 53. The individual contact points 37 and 38 are associated with a pressure ellipse 49 occurring as a result of the osculation conditions between the balls 13 and the running groove flank 51 of the first running grooves 6 and 10.

The distance between the contact points 37 and 38 and the running groove edges 52 and 53 is dimensioned to be greater than half the greatest axis 50 of the pressure ellipse 49. Only if these conditions are met is it possible to avoid deformation at the running groove edges 52 and 53 when the joint is operated.

Referring to the top half of FIG. 7, the cage control angle $\beta$ must be maintained at a minimum angle to ensure that with reference to the first running grooves 6 and 10, the balls always load the cage 14 against the window face 18 in the contact point 39 nearest to the open end face 3 and with reference to the second running grooves 7 and 11 load the cage 14 against the cage window face 19 nearest to the open end face 4. For this purpose, the cage control angle $\beta$, with reference to one rotation, has to exceed a certain value in all articulation positions and also in al rotational positions in order to achieve the guiding conditions in accordance with the present invention, e.g. to be able to arrange the cage 15 with play and ensure its stability relative to the outer member 2 and inner member 3. The cage control angle $\beta$ always has to be greater than the self-inhibition angle, i.e., greater than 7°. As can be seen in FIG. 7, the cage control angle $\beta$ lies in a plane containing the connecting lines 45 and 46 from the ball center 44 to the two contact points 38 and 37. The cage control angle B is the angle formed by the intersection of the perpendicular lines 47 and 48 which extend perpendicularly from connecting lines 45 and 46 at the contact points 37 and 38. The contact points 37 and 38 themselves are not positioned in the drawing plane.

The most critical position for dimensioning purposes are the positions assumed by the ball 13 in FIG. 1 and at the bottom of FIG. 7. For these positions, the angle $\beta$ must be at least 7°. With an off-set controlled joint, for example, these conditions are ensured if the angle of offset of all running grooves relative to the joint center is also at least 7°, but preferably greater. For maximum articulation the angle $\beta$ for the ball 13 shown at the bottom of FIG. 7 will always exceed the value of 7°. For the other positions of the balls 13, less articulation of the joint, the angle $\beta$ becomes greater so that the desired guiding conditions and thus contact conditions for the cage 14 and balls 13 are always achieved.

For the second running grooves 7 and 11 the same conditions are required, in a mirror image relationship with the cage control angle $\beta$ extending from the second opening end face 4 as shown in the bottom half of FIG. 7. The cage control angle $\beta$ must be greater than the self-inhibition angle, i.e. greater than 7° for all articulation and rotational positions.

The special contact conditions and thus control conditions cannot only be achieved by contact tracks 40 and 41 of the running grooves designed like a circular arch, but by any contact track shape, but the contact points, as a function of the articulation and movement of the balls 13 in the outer running grooves 6 and 7 and inner running grooves 10 and 11, have to be designed in such a way that the minimum cage control angle $\beta$ of 7° and the required distance between the contact points 37 and 38 and the running groove edges 52 and 53 ar achieved from the individual positions. For instance, the composite track shape of the running grooves 6 and 7; 10 and 11 with gothic or elliptical cross sections may be designed on the basis of the above criteria. Preferably, the track cross section should be such that a two-point contact is ensured, and under torque and depending on the direction of rotation, one of the contact tracks establishes an operating connection with the ball 13 at the running groove flank 51. The change in the contact tracks 40 and 41 towards the axial ends should be designed in such a way as to include a transition zone 42 or 43 in which the necessary distance of the contact points 37 and 38 from the running groove edges 52 and 53 is achieved by changing the contact angle.

What is claimed is:

1. A constant velocity fixed joint with opposing open end faces comprising:

an outer member with a central cavity having an inner surface, said inner surface, in meridian planes, being provided with first and second outer running grooves axially extending along the longitudinal axis of the outer member, said first and second outer running grooves having an undercut-free surface disposed in an opposite direction with respect to one another which alternate on the circumference in a predetermined sequence, said inner surface further having webs between circumferentially adjoining outer running grooves divided into first and second inner faces, said first and second inner faces having a partially spherical surface and an undercut-free surface disposed in an opposite direction to one another, said under-free surface of said first and second inner faces being in the same direction as said undercut-free surface of said adjoining outer running groove;

an inner member arranged in the central cavity of the outer member with a spherical outer face which, in meridian planes, is provided with first and second inner running grooves axially extending along the longitudinal axis of the inner member in an opposite direction with respect to one another which are positioned opposite the respective first or second outer running grooves, the track bases of the first outer running grooves and the first inner running grooves being undercut-free starting from one open end face and the track bases of the second outer running grooves and the second inner running grooves being undercut-free from the other open end face, together the outer and inner running grooves are jaw-like towards one of the two open end faces;

ball for torque transmitting purposes;

a cage arranged between the outer face of the inner member and the inner face of the outer member, the cage having a spherical inner face arranged concentrically with the spherical outer face of the inner member and a spherical outer face arranged concentrically with said spherical surface of said first and second inner surfaces of said outer member.

2. A constant velocity fixed joint according to claim 1, wherein the predetermined sequence is such that the first and second running grooves are alternately circumferentially arranged one behind the other about the inner face of the outer member.

3. A constant velocity fixed joint according to claim 1 wherein the first and second outer running grooves are circumferentially arranged one behind the other in a sequence of groups of at least two first outer running grooves and two second outer running grooves.

4. A constant velocity fixed joint according to claim 1 wherein the cage is an assembly of two or more annular cage segments.

5. A constant velocity fixed joint according to claim 4 wherein the circumferential ends of the annular cage or segments are form-fittingly connected to each other in the axial direction by matching projections and indentations.

6. A constant velocity fixed joint according to claim 1 wherein for both directions of rotation, over the entire range of articulation angles and in all rotational angular positions, the contact tracks of the balls in the first and second outer running grooves are traced by opposing contact points of the balls in the associated outer running grooves and inner running grooves which define a cage control angle which is always greater than a predetermined angle.

7. A constant velocity fixed joint according to claim 6 wherein the outer running grooves and the inner running grooves as extending in their respective meridian planes are at least partly circular arches which are offset towards opposing ends from the central ball plane.

8. A constant velocity fixed joint according to claim 6 wherein the cross sectional shape of the first and second outer running grooves and the first and second inner grooves deviates from a circular shape.

9. A constant velocity fixed joint according to claim 6, wherein the contact tracks formed by the individual contact point of the balls in the running grooves across the articulation range are a predetermined distance from the groove edge at the outer member inner face and the outer running groove and at the inner member outer face and the inner running groove, the predetermined distance being greater than half the distance of the large axis of a pressure ellipse occurring as a result of osculation conditions between the balls and grooves permissible for the respective angle of articulation and associated torque.

10. A constant velocity fixed joint according to claim 9 wherein in the regions of the contact tracks towards their two axial ends, the large axis of the pressure ellipse is smaller than in the central region of the contact tracks.

11. A constant velocity fixed joint according to claim 10 wherein the osculation between the balls and their contact tracks is increased towards the contact tracks axial end regions.

12. A constant velocity fixed joint according to claim 10 wherein the cross section of each of the outer and inner running grooves increases from one axial end of each said groove toward the other axial end of each said groove.

13. A constant velocity fixed joint according to claim 6, wherein the contact tracks formed by the individual contact points of the balls in the running grooves across the articulation range are a predetermined distance from the groove edge at the outer member inner face and the outer running groove or at the inner member outer face and the inner running groove, the predetermined distance being greater than half the distance of the large axis of a pressure ellipse occurring as a result of osculation conditions between the balls and grooves permissible for the respective angle of articulation and associated torque.

14. A constant velocity fixed joint according to claim 1 wherein the outer member comprises two or more annular segments coupled with one another and adapted to be coupled with a bell housing.

15. A constant velocity fixed joint according to claim 14 wherein the annular segments are produced by breaking a whole outer member, after it has been finished to its final dimensions.

16. A constant velocity fixed joint according to clam 15 wherein the whole outer member is broken along breaking regions located in the webs.

17. A constant velocity fixed joint according to claim 16 wherein the webs having breaking regions have bores to weaken the webs for breaking.

18. A constant velocity fixed joint according to claim 16 wherein the webs having breaking regions are provided with radially inward extending notches.

19. A constant velocity fixed joint according to claim 1 wherein the outer member on one or more of its faces has tooth-like projections, the outer member being adapted to be received in a bell, the wall of the bell adapted to form-fittingly receive the outer member and non-rotatingly attach to the recesses through non-chip forming deformation of the wall after receipt of the outer member.

* * * * *